(12) United States Patent
Åberg et al.

(10) Patent No.: US 10,877,808 B2
(45) Date of Patent: Dec. 29, 2020

(54) TASK SCHEDULING

(71) Applicant: Telefonaktiebolaget LM Ericsson (publ), Stockholm (SE)

(72) Inventors: Patrik Åberg, Södra Sandby (SE); Bengt Wikenfalk, Helsingborg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/340,486

(22) PCT Filed: Oct. 10, 2016

(86) PCT No.: PCT/EP2016/074174
§ 371 (c)(1),
(2) Date: Apr. 9, 2019

(87) PCT Pub. No.: WO2018/068809
PCT Pub. Date: Apr. 19, 2018

(65) Prior Publication Data
US 2019/0243689 A1   Aug. 8, 2019

(51) Int. Cl.
*G06F 9/50* (2006.01)
*G06F 12/084* (2016.01)
*G06F 9/48* (2006.01)

(52) U.S. Cl.
CPC .......... *G06F 9/5033* (2013.01); *G06F 9/4843* (2013.01); *G06F 9/5027* (2013.01); *G06F 12/084* (2013.01); *G06F 2212/1041* (2013.01); *G06F 2212/62* (2013.01); *Y02D 10/00* (2018.01)

(58) Field of Classification Search
CPC ....................................................... G06F 9/5033
See application file for complete search history.

(56) References Cited

U.S. PATENT DOCUMENTS

| | | | |
|---|---|---|---|
| 7,487,317 B1 | 2/2009 | Fedorova et al. | |
| 2002/0078124 A1 | 6/2002 | Baylor et al. | |
| 2008/0134184 A1* | 6/2008 | Fedorova | G06F 11/3452 718/102 |
| 2008/0134185 A1* | 6/2008 | Fedorova | G06F 9/4881 718/102 |
| 2011/0246995 A1* | 10/2011 | Fedorova | G06F 9/5033 718/103 |
| 2012/0233393 A1 | 9/2012 | Jiang et al. | |
| 2015/0186185 A1 | 7/2015 | Zaroo | |

* cited by examiner

*Primary Examiner* — Sisley N Kim
(74) *Attorney, Agent, or Firm* — Murphy, Bilak & Homiller, PLLC

(57) ABSTRACT

There is provided mechanisms for scheduling a task from a plurality of tasks to a processor core of a cluster of processor cores. The processor cores share caches. A method is performed by a controller. The method comprises determining group-wise task relationships between the plurality of tasks based on duration of cache misses resulting from running groups of the plurality of tasks on processor cores sharing the same cache. The method comprises scheduling the task to one of the processor cores based on the group-wise task relationships of the task.

16 Claims, 4 Drawing Sheets

TASK SCHEDULING

TECHNICAL FIELD

Embodiments presented herein relate to a method, a controller, a computer program, and a computer program product for scheduling a task from a plurality of tasks to a processor core of a cluster of processor cores, where the processor cores share caches.

BACKGROUND

In general terms, a thread of execution can be defined as the smallest sequence of programmed instructions that can be managed independently by a scheduler, which is typically a part of the operating system. The implementation of threads and processes differs between operating systems, but in most cases a thread is a component of a process. Multiple threads can exist within one process, executing concurrently and sharing resources such as memory, while different processes do not share these resources. In particular, the threads of a process share its executable code and the values of its variables at any given time. Systems with a single processor generally implement multithreading by time slicing: the central processing unit (CPU) switches between different software threads. This context switching generally happens very often and rapidly enough that users perceive the threads or tasks as running in parallel. On a multiprocessor or multi-core system, i.e., a system using a cluster of processor cores, multiple threads can execute in parallel, with every processor or core executing a separate thread simultaneously; on a processor or core with hardware threads, separate software threads can also be executed concurrently by separate hardware threads.

There exist different mechanisms for scheduling tasks to the cores. For example, depending on the core, cluster and system capacity, the scheduler could select an idle core, an idle cluster or adds more jobs to an already active cluster. It could also be possible to have static definitions on where to deploy a thread (i.e. to which core a task should be scheduled to).

The threads may or may not share parts of the (cacheable memory) working-set and the threads may or may not introduce cache aliasing effects in certain combinations. Only having static definitions on where to deploy a thread can be made to take this situation into account. Scheduling based on static definitions provides the possibility to make optimal placement of the tasks to the cores, but could require big effort in careful studies of the working-set behavior for the individual threads in order to analyze the shared working-set usage. Furthermore, the common usage will differ with dynamic effects, impossible to capture with static analysis methods. Another possibility is to use system simulations to capture the required characteristics, but also this requires big efforts in terms of computational resources. This work needs to be repeated for each new software build.

Hence, there is still a need for an improved scheduling of tasks for a cluster of processor cores.

SUMMARY

An object of embodiments herein is to provide efficient scheduling of tasks for a cluster of processor cores.

According to a first aspect there is presented a method for scheduling a task from a plurality of tasks to a processor core of a cluster of processor cores. The processor cores share caches. The method is performed by a controller. The method comprises determining group-wise task relationships between the plurality of tasks based on duration of cache misses resulting from running groups of the plurality of tasks on processor cores sharing the same cache. The method comprises scheduling the task to one of the processor cores based on the group-wise task relationships of the task.

According to a second aspect there is presented a controller for scheduling a task from a plurality of tasks to a processor core of a cluster of processor cores. The processor cores sharing caches. The controller comprises processing circuitry. The processing circuitry is configured to cause the controller to determine group-wise task relationships between the plurality of tasks based on duration of cache misses resulting from running groups of the plurality of tasks on processor cores sharing the same cache. The processing circuitry is configured to cause the controller to schedule the task to one of the processor cores based on the group-wise task relationships of the task.

According to a third aspect there is presented a controller for scheduling a task from a plurality of tasks to a processor core of a cluster of processor cores. The processor cores share caches. The controller comprises processing circuitry and a storage medium. The storage medium stores instructions that, when executed by the processing circuitry, causes the controller to perform operations, or steps. The operations, or steps, cause the controller to determine group-wise task relationships between the plurality of tasks based on duration of cache misses resulting from running groups of the plurality of tasks on processor cores sharing the same cache. The operations, or steps, cause the controller to schedule the task to one of the processor cores based on the group-wise task relationships of the task.

According to a fourth aspect there is presented a controller for scheduling a task from a plurality of tasks to a processor core of a cluster of processor cores. The processor cores share caches. The controller comprises a determine module configured to determine group-wise task relationships between the plurality of tasks based on duration of cache misses resulting from running groups of the plurality of tasks on processor cores sharing the same cache. The controller comprises a schedule module configured to schedule the task to one of the processor cores based on the group-wise task relationships of the task.

According to a fifth aspect there is presented a computer program for scheduling a task from a plurality of tasks to a processor core of a cluster of processor cores, where the processor cores share caches. The computer program comprises computer program code which, when run on a controller, causes the controller to perform a method according to the first aspect.

According to a sixth aspect there is presented a computer program product comprising a computer program according to the fifth aspect and a computer readable storage medium on which the computer program is stored. The computer readable storage medium could be a non-transitory computer readable storage medium.

Advantageously this method and this controller provide efficient scheduling of the task for a cluster of processor cores.

Advantageously this method and this controller enable scheduling of tasks to fit together.

Advantageously this method and this controller enable statistical data to be continuously sampled and learned by the controller how to schedule tasks for optimal cache performance.

Advantageously this method and this controller enable all-in-all memory performance to be enhanced by machine learning.

Advantageously this method and this controller is applicable for scheduling of tasks in complex systems that operate on data chunks and send it to the next task to operate on that data chunk.

Advantageously this method and this controller enable improved overall performance of the computing system in which the tasks are scheduled.

Advantageously this method and this controller enable improved power consumption of the computing system in which the tasks are scheduled.

Advantageously this method and this controller enable software optimizations aiming at cache performance not to be needed.

It is to be noted that any feature of the first, second, third, fourth, fifth and sixth aspects may be applied to any other aspect, wherever appropriate. Likewise, any advantage of the first aspect may equally apply to the second, third, fourth, fifth and/or sixth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
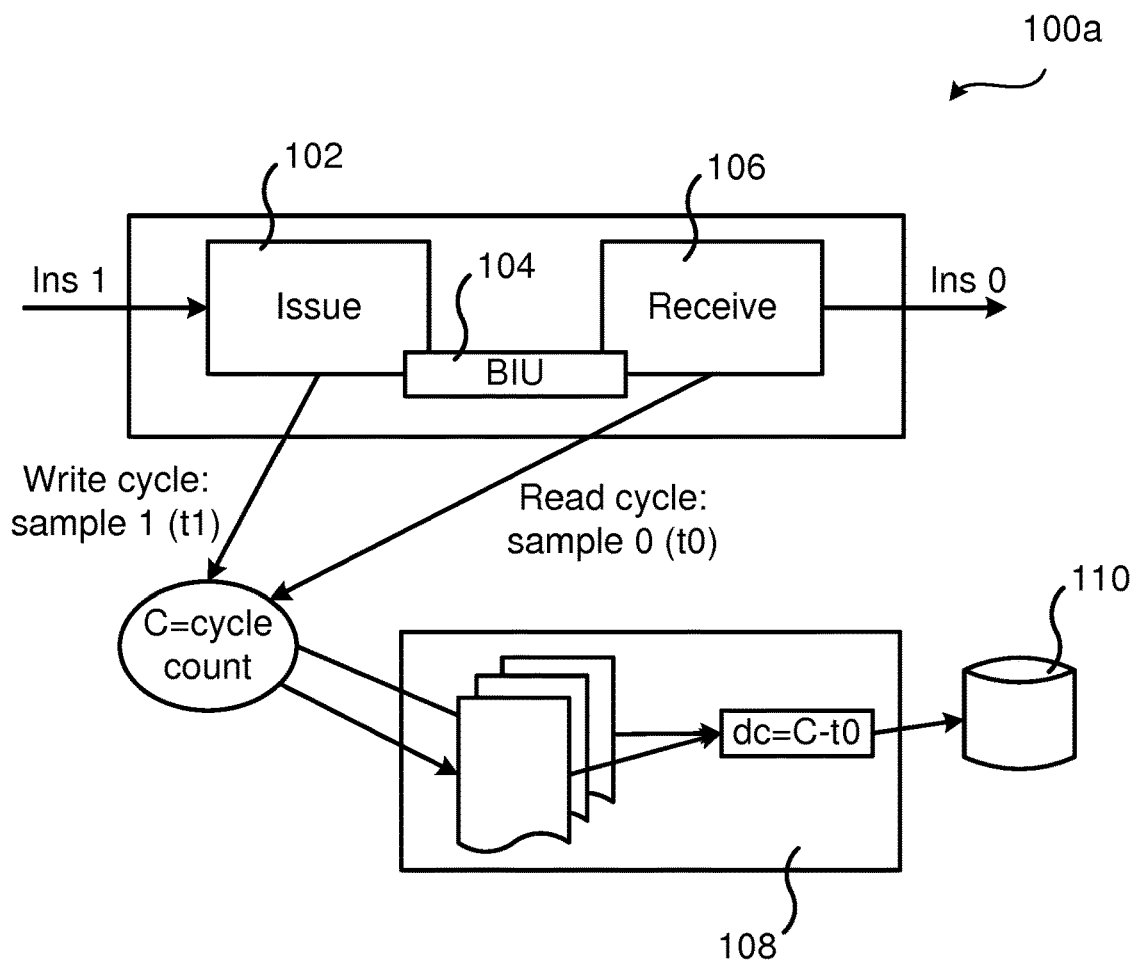
FIGS. 1 and 2 are schematic diagram illustrating computing systems according to embodiments.

FIG. 1 is a schematic diagram illustrating a computing system 100*a* according to embodiments. When the processor pipeline is required to access data outside register banks, a current instruction (denoted Ins 0; the notation Ins 1 is used for a next instruction) is processed by a pipeline issue stage 102. The issue stage 102 requests the processor's bus interface unit (BUI) 104 (also referred to as cache port) to fetch requested data and concurrently commands the sample fifo 106 (where fifo is short for first in first out) to register the current cycle count (denoted t0; for the next instruction the corresponding cycle count is denoted t1). At the pipeline receive stage 106, when the pipeline receives data from the BIU, the sample fifo 108 is commanded to sample the current cycle (C) again. This marks the end of the transaction for instruction Ins 0. The sample fifo executes the subtraction dc=C−t0, and requests the penalty time accumulator (PTA) 110 to add the result dc to its current value; its accumulated penalty time. The accumulated penalty time is read by the operating system (OS) scheduler, and stored in the cache penalty statistics that is used to take a scheduling decision.

Figure 2:
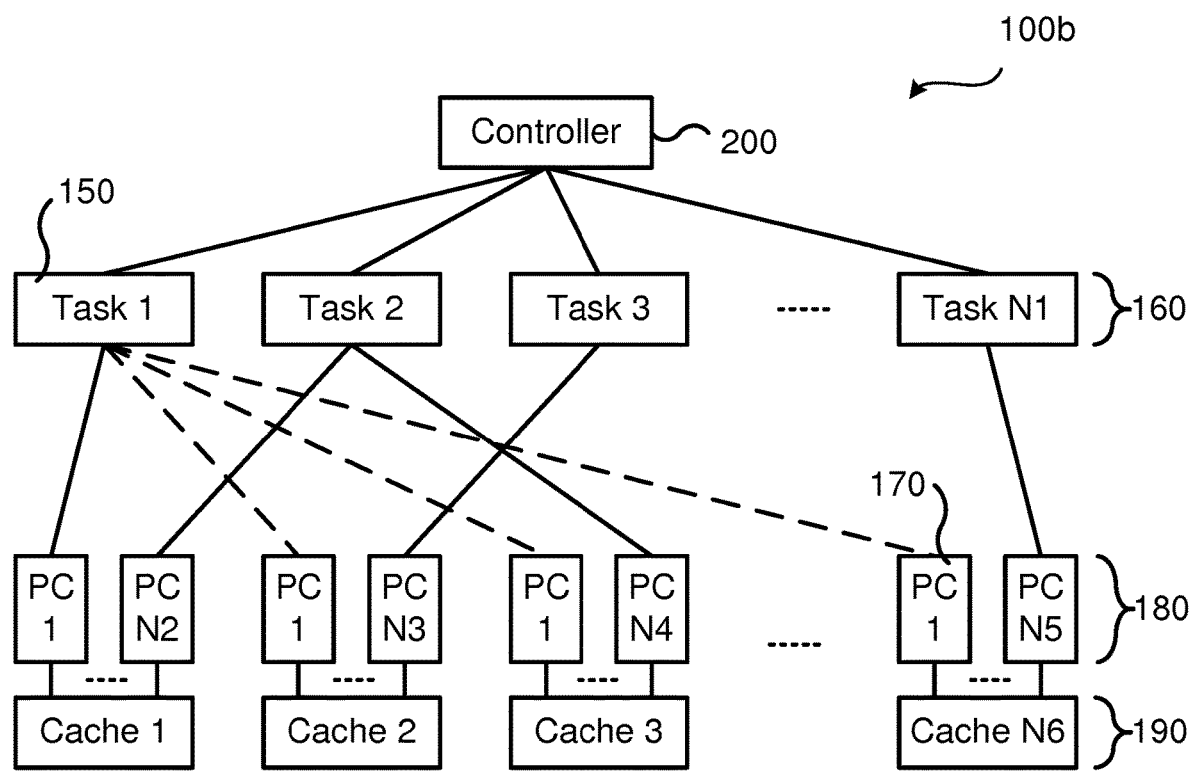

FIG. 2 is a schematic diagram illustrating a computing system 100*b* according to embodiments. The computing system 100*b* comprises N6 number of caches 190, where cache 1 is shared by N2 number of processor cores (PC) from a cluster of processor cores 180, where cache 2 is shared by N3 number of processor cores from the cluster of processor cores 180, where cache 3 is shared by N4 number of processor cores from the cluster of processor cores 180, and where cache N6 is shared by N5 number of processor cores from the cluster of processor cores 180. N1 number of different tasks 160 are repeatedly scheduled on the cluster of processor cores 180. In this respect, all numbers N1-N6 could be different. Alternatively, at least two of the numbers N1-N6 are equal. A controller 200 is provided for scheduling a task 150 from the plurality of tasks 160 to a processor core 170 of the cluster of processor cores 180.

The embodiments disclosed herein thus relate to mechanisms for scheduling a task 150 from a plurality of tasks 160 to a processor core 170 of a cluster of processor cores 180. In order to obtain such mechanisms there is provided a controller 200, a method performed by the controller 200, a computer program product comprising code, for example in the form of a computer program, that when run on a controller 200, causes the controller 200 to perform the method.

Figure 3:
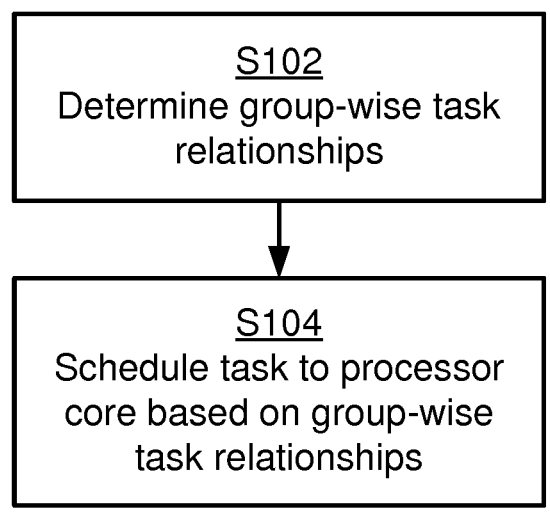
FIG. 3 is a flowchart of methods according to embodiments.

Reference is now made to FIG. 3 illustrating a method for scheduling a task 150 from a plurality of tasks 160 to a processor core 170 of a cluster of processor cores 180. The processor cores 180 share caches 190. The method is performed by the controller 200. The method is advantageously provided as a computer program 720.

The method is based on determining task relationship between tasks 160 based on how well the tasks perform together in the caches 190. Hence, the controller is configured to perform step S102:

S102: The controller 200 determines group-wise task relationships between the plurality of tasks 160 based on duration of cache misses resulting from running groups of the plurality of tasks 160 on processor cores 180 sharing the same cache 190.

The method is further based on scheduling the task 150 with respect to its task relationship with the other tasks 160. Hence, the controller is configured to perform step S104:

S104: The controller 200 schedules the task 150 to one of the processor cores 170 based on the group-wise task relationships of the task 150.

This method introduces a way to sample data enough to provide (real-time) updated information on which tasks of a plurality of tasks 160 are suited to run together, and also which tasks should avoid executing together in a cluster of processor cores 180. This means that tasks are scheduled with respect to the relationship with other tasks. This relationship is in turn determined based on how well the tasks perform together in the caches 190. That is, instead of scheduling tasks 160 to cores 180, the tasks 160 are scheduled to caches 190 (associated with the cores 180).

Embodiments relating to further details of scheduling a task 150 as performed by the controller 200 will now be disclosed.

According to an embodiment the task 150 is scheduled to the processor core 170 corresponding to the group-wise task relationship of the task with minimum value. Each group-wise task relationship could be based on averaged individual task relationships. How to determine the individual task relationships will be disclosed next.

Figure 4:
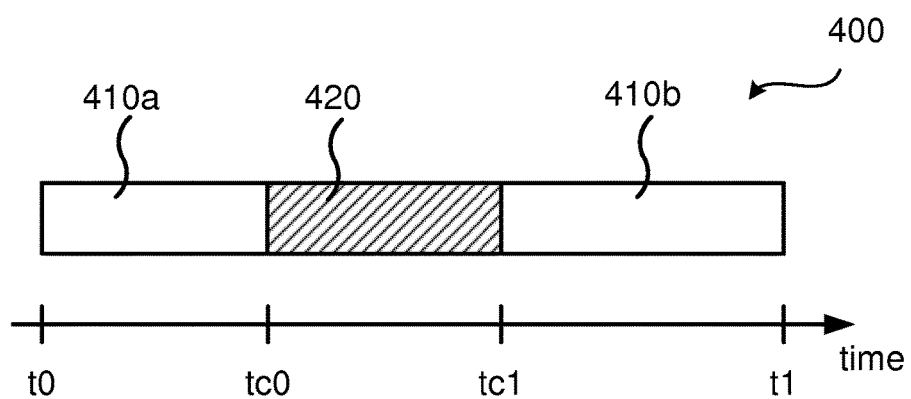
FIG. 4 is a schematic diagram illustrating a task execution including penalty for cache misses according to an embodiment.

FIG. 4 is a schematic diagram 400 illustrating duration of executing a task 150 in one of the processor cores 180 including the penalty for cache misses. In more detail, execution of the task 150 starts at time and finishes at time t1. That is, the total duration of running the task is t1−t0. This total duration includes the duration of cache misses, symbolically illustrated from time tc0 to time tc1. According to an embodiment each individual task relationship is based on a ratio between the duration tc0−tc0 of cache misses and total duration t1−t0 of running one of the tasks.

According to the illustration in FIG. 4 the time for executing the task not considering cache misses is divided in two chunks 410a, 410b, separated by a chunk 420 corresponding to the penalty for cache misses. However, as the skilled person understands, FIG. 4 is a simple illustration and does not necessarily illustrated practical execution of a task by a processor core; cache misses could occur any time between t0 and t1 and may thus be spread out at a plurality of such chunks 420 between t0 and t1.

Further, the individual task relationship at time index n could depends on the individual task relationship at time index n−1. That is, according to an embodiment the individual task relationship at time index n for running Task A on the processor core sharing cache X depends on the individual task relationship at time index n−1 for running task A on the processor core sharing cache X. In the example of FIG. 2, A takes a value from 1 to N1 and X takes a value from 1 to N6.

In view of the above, the individual task relationship is based on a ratio between the duration tc1−tc0 of cache misses and total duration t1−t0 of running one of the tasks and the individual task relationship at time index n for running Task A on the processor core sharing cache X depends on the individual task relationship at time index n−1 for running task A on the processor core sharing cache X. Hence, according to an embodiment the individual task relationship at time index n for running task A on the processor core sharing cache X has a value R(A,X)[n] given by:

$$R(A,X)[n]=((k-1)\cdot R(A,X)[n-1]+(tc1-tc0)/(t1-t0))/k,$$

where k>1 is parameter.

There could be different ways to select the value of k. In general terms, the value of k decides the speed with which the tasks will be associated with each other. Typically k could be large enough to out-weight any of the effects of:
- several different tasks having been executed in the same cache as the task sampled at completion,
- functional variations in the completed task from one spawn to another (where a spawn is a function that loads and executes a new child process),
- functional variations in the other tasks running in the same cache from one spawn to another, and/or
- the distribution of run-length for the tasks in the computing system.

As disclosed above, the group-wise task relationship could be based on averaged individual task relationships. Hence, the group-wise task relationship G(X)[n] at time n for cache X shared by PC 1, PC2, ..., PC Nx for Task A, Task B, ..., Task Z could be determined as $$G(X)[n]=(R(A,X)[n]+R(B,X)[n]+\ldots+R(Z,X)[n])/Nx.$$

For example, with reference to the illustrative example of FIG. 2, when a task of type Task 1 has finished it execution in PC 1 of Cache 1, the entries for the relationship between Task 1 and Task 2 (which shares Cache 1 with Task 1) could be updated with a weighted average. Hence, according to an embodiment, group-wise task relationships for all tasks using the same one of the caches are updated every time one of the individual task relationships of this same one of the caches is updated. Then, for the illustrative example of FIG. 2, the lower the number of the individual task relationship at time index n for running Task 1 on processor core PC 1 sharing cache 1 with processor core PC N2 on which Task 2 is run, the more probable that Tasks 1 and Task 2 should share cache also in the future. That is, when Task 1 is run on processor core PC 1 of Cache 1, an individual task relationship for running Task 2 on processor core PC N2 of Cache 1 is also determined. That is, according to an embodiment there are as many individual task relationships per group-wise task relationship as there are processor cores per group-wise task relationship. Further, according to an embodiment there are as many group-wise task relationships as there are caches.

There could be equally or unequally many caches per processor core. According to an embodiment all caches 190 are shared by equally many of the processor cores. Hence, according to this embodiment N2=N3=N4=N5. According to another embodiment the caches 190 are shared by unequally many of the processor cores. Hence, according to this embodiment N2, N3, N4, and N5 take values in a set comprising at least two different numbers such that Ni≠Nj for at least one i, j in the set {2, 3, 4, 5} for i≠j.

There could be different kinds of tasks. According to an embodiment the tasks are run-to-completion tasks. Each one of the tasks could correspond to a software thread. Hence, according to an embodiment the tasks are software threads.

There could be different kinds of clusters of processor cores 190. For example, the cluster of processor cores 190 could be part of a digital signal processor. The cluster of processor cores 190 could be part of one single digital signal processor or of a cluster of digital signal processors. Further in this respect, the controller 200 could be implemented in a control unit of the digital signal processor(s). Additionally or alternatively, the cluster of processor cores 190 is part of a cloud computing system. Hence, according to an embodiment the computing system 100b is a cloud computing system. Further in this respect, the controller 200 could be implemented in a control unit of the cloud computing system.

Figure 5:
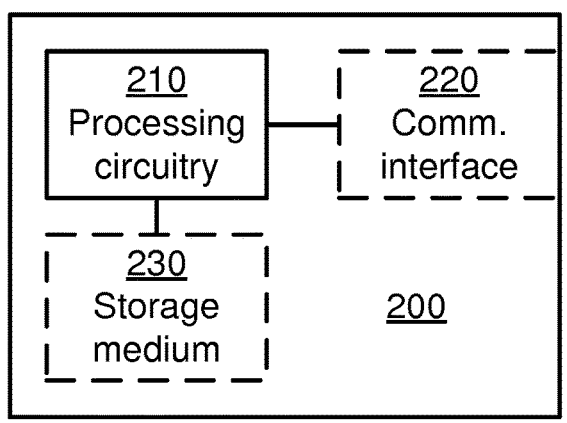
FIG. 5 is a schematic diagram showing functional units of a controller according to an embodiment.

FIG. 5 schematically illustrates, in terms of a number of functional units, the components of a controller 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 710 (as in FIG. 7), e.g. in the form of a storage medium 230. The processing circuitry 210 may further be provided as at least one application specific integrated circuit (ASIC), or field programmable gate array (FPGA).

Particularly, the processing circuitry 210 is configured to cause the controller 200 to perform a set of operations, or steps, S102-S104, as disclosed above. For example, the storage medium 230 may store the set of operations, and the processing circuitry 210 may be configured to retrieve the set of operations from the storage medium 230 to cause the controller 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The controller 200 may further comprise a communications interface 220 at least configured for communications with entities of the computing system 100b, such as the tasks 160, the cluster of processor cores 180, and the caches 190. As such the communications interface 220 may comprise one or more transmitters and receivers, comprising analogue and digital components. The processing circuitry 210 controls the general operation of the controller 200 e.g. by sending data and control signals to the communications interface 220 and the storage medium 230, by receiving data and reports from the communications interface 220, and by retrieving data and instructions from the storage medium 230. Other components, as well as the related functionality, of the controller 200 are omitted in order not to obscure the concepts presented herein.

Figure 6:
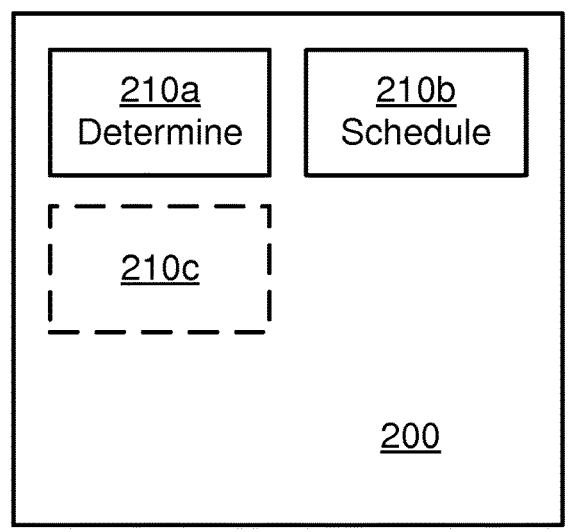
FIG. 6 is a schematic diagram showing functional modules of a controller according to an embodiment.

FIG. 6 schematically illustrates, in terms of a number of functional modules, the components of a controller 200 according to an embodiment. The controller 200 of FIG. 6 comprises a number of functional modules; a determine module 210a configured to perform step S102, and a schedule module 210b configured to perform step S104. The controller 200 of FIG. 6 may further comprise a number of optional functional modules, as symbolized by functional module 210C. In general terms, each functional module 210a-210C may in one embodiment be implemented only in hardware or and in another embodiment with the help of software, i.e., the latter embodiment having computer program instructions stored on the storage medium 230 which when run on the processing circuitry makes the controller 200 perform the corresponding steps mentioned above in conjunction with FIG. 6. It should also be mentioned that even though the modules correspond to parts of a computer program, they do not need to be separate modules therein, but the way in which they are implemented in software is dependent on the programming language used. Preferably, one or more or all functional modules 210a-210c may be implemented by the processing circuitry 210, possibly in cooperation with functional units 220 and/or 230. The processing circuitry 210 may thus be configured to from the storage medium 230 fetch instructions as provided by a functional module 210a-210c and to execute these instructions, thereby performing any steps as disclosed herein.

The controller 200 may be provided as a standalone device or as a part of at least one further device. Further, a first portion of the instructions performed by the controller 200 may be executed in a first device, and a second portion of the of the instructions performed by the controller 200 may be executed in a second device; the herein disclosed embodiments are not limited to any particular number of devices on which the instructions performed by the controller 200 may be executed. Hence, the methods according to the herein disclosed embodiments are suitable to be performed by a controller 200 residing in a cloud computational environment. Therefore, although a single processing circuitry 210 is illustrated in FIG. 5 the processing circuitry 210 may be distributed among a plurality of devices, or nodes. The same applies to the functional modules 210a-210c of FIG. 6 and the computer program 720 of FIG. 7 (see below).

Figure 7:
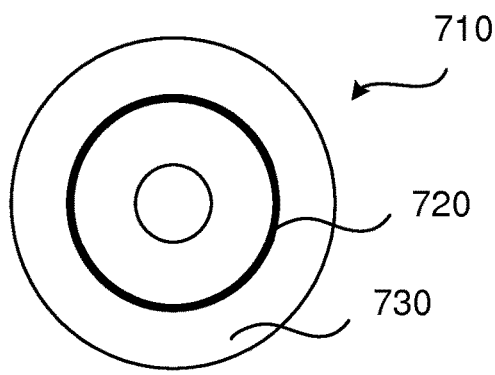
FIG. 7 shows one example of a computer program product comprising computer readable storage medium according to an embodiment.

FIG. 7 shows one example of a computer program product 710 comprising computer readable storage medium 730. On this computer readable storage medium 730, a computer program 720 can be stored, which computer program 720 can cause the processing circuitry 210 and thereto operatively coupled entities and devices, such as the communications interface 220 and the storage medium 230, to execute methods according to embodiments described herein. The computer program 720 and/or computer program product 710 may thus provide means for performing any steps as herein disclosed.

In the example of FIG. 7, the computer program product 710 is illustrated as an optical disc, such as a CD (compact disc) or a DVD (digital versatile disc) or a Blu-Ray disc. The computer program product 710 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 720 is here schematically shown as a track on the depicted optical disk, the computer program 720 can be stored in any way which is suitable for the computer program product 710.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for scheduling a task from a plurality of tasks to a processor core of a cluster of processor cores, the processor cores sharing caches, the method being performed by a controller, the method comprising:

determining group-wise task relationships between the plurality of tasks based on duration of cache misses resulting from running groups of the plurality of tasks on processor cores sharing the same cache; and scheduling the task to one of the processor cores based on the group-wise task relationships of the task;

wherein each group-wise task relationship is based on individual task relationships and each individual task relationship is based on a ratio between the duration (tc1−tc0) of cache misses and total duration (t1−t0) of running one of the plurality of tasks.

2. The method according to claim 1, wherein the task is scheduled to the processor core corresponding to the group-wise task relationship of the task with minimum value.

3. The method according to claim 1, wherein each group-wise task relationship is based on averaged individual task relationships.

4. The method according to claim 1, wherein the individual task relationship at time index n for running task A on the processor core sharing cache X depends on the individual task relationship at time index n−1 for running task A on the processor core sharing cache X.

5. The method according to claim 1, wherein the individual task relationship at time index n for running task A on the processor core sharing cache X has a value R(A,X)[n] given by:

$$R(A,X)[n]=((k-1)\cdot R(A,X)[n-1]+(tc1-tc0)/(t1-t0))/k,$$

where k>1 is parameter.

6. The method according to claim 3, wherein group-wise task relationships for all tasks using a same one of the caches are updated every time one of the individual task relationships of the same one of the caches is updated.

7. The method according to claim 3, wherein there are as many individual task relationships per group-wise task relationship as there are processor cores per group-wise task relationship.

8. The method according to claim 1, wherein there are as many group-wise task relationships as there are caches.

9. The method according to claim 1, wherein all caches are shared by equally as many of the processor cores.

10. The method according to claim 1, wherein the caches are shared by unequally as many of the processor cores.

11. The method according to claim 1, wherein the plurality of tasks are run-to-completion tasks.

12. The method according to claim 1, wherein the plurality of tasks are software threads.

13. The method according to claim 1, wherein the cluster of processor cores is part of one single digital signal processor.

14. The method according to claim 1, wherein the cluster of processor cores is part of a cloud computing system.

15. A controller configured for scheduling a task from a plurality of tasks to a processor core of a cluster of processor cores, the processor cores sharing caches, the controller comprising processing circuitry, the processing circuitry being configured to cause the controller to:
determine group-wise task relationships between the plurality of tasks based on duration of cache misses resulting from running groups of the plurality of tasks on processor cores sharing the same cache; and
schedule the task to one of the processor cores based on the group-wise task relationships of the task;
wherein each group-wise task relationship is based on individual task relationships and each individual task relationship is based on a ratio between the duration (tc1−tc0) of cache misses and total duration (t1−t0) of running one of the plurality of tasks.

16. A controller configured for scheduling a task from a plurality of tasks to a processor core of a cluster of processor cores, the processor cores sharing caches, the controller comprising:
processing circuitry; and
a storage medium storing instructions that, when executed by the processing circuitry, cause the controller to:
determine group-wise task relationships between the plurality of tasks based on duration of cache misses resulting from running groups of the plurality of tasks on processor cores sharing the same cache; and
schedule the task to one of the processor cores based on the group-wise task relationships of the task;
wherein each group-wise task relationship is based on individual task relationships and each individual task relationship is based on a ratio between the duration (tc1−tc0) of cache misses and total duration (t1−t0) of running one of the plurality of tasks.

* * * * *